Patented May 3, 1927.

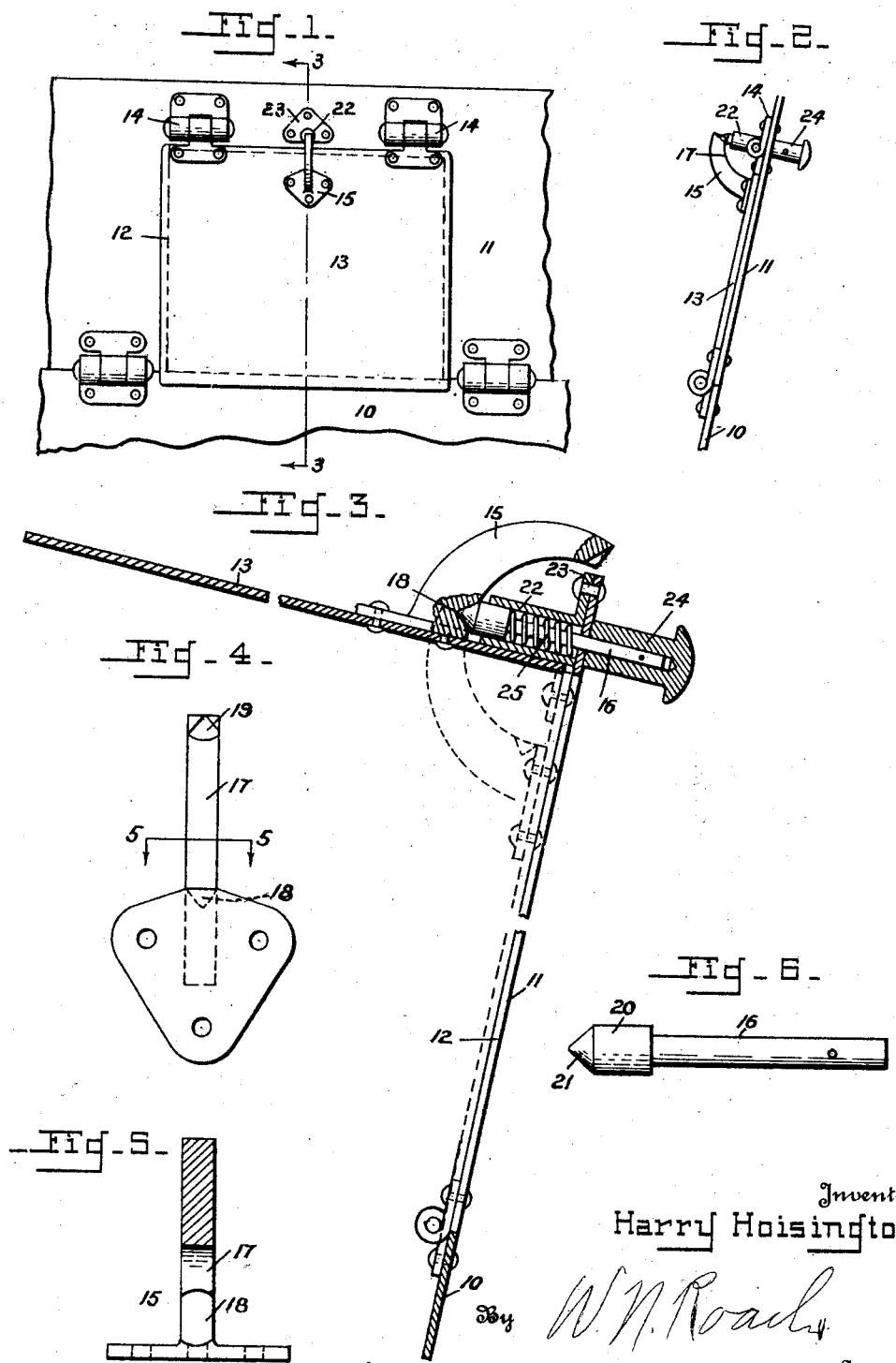

1,626,827

UNITED STATES PATENT OFFICE.

HARRY HOISINGTON, OF DAVENPORT, IOWA.

SHUTTER LATCH FOR SHIELDS.

Application filed November 22, 1924. Serial No. 751,718.

(GRANTED UNDER THE ACT OF MARCH 3, 1883; 22 STAT. L. 625.)

The invention described herein may be used by the Government, or any of its officers or employees in prosecution of work for the Government, or by any other person in the United States, without payment to me of any royalty thereon, in accordance with the act of March 3, 1883.

The subject of this invention is a shutter latch for shields.

Armor plate shields for artillery are provided with port holes to permit sighting of the gun on the target or aiming point. To protect the sight and the sighting gunner, the port holes are adapted to be covered or closed by shutters.

The object of the present invention is to provide a shutter latch which will positively hold the shutter in the open position and which may easily and quickly be operated by the gunner to release the shutter to the closed position where it is securely held in place.

To these and other ends, my invention consists in the construction, arrangement, and combination of elements, described hereinafter and pointed out in the claims forming a part of this specification.

A practical embodiment of my invention is illustrated in the accompanying drawings, wherein:

Fig. 1 is a front elevation of a shield equipped with a shutter and latch constructed in accordance with the invention;

Fig. 2 is a side view thereof;

Fig. 3 is a sectional view on the line 3—3 of Fig. 1 and showing the shutter in the raised position;

Fig. 4 is a front elevation of the latch plate;

Fig. 5 is a sectional view on the line 5—5 of Fig. 4; and

Fig. 6 is a detail view of the plunger.

In carrying out the invention, there is provided an armor plate shield 10, the top plate 11 of which is formed with a sighting aperture or port hole 12 to permit training of the sights (not shown) which are mounted on the gun in rear of the shield.

In order to cover the port hole when the sighting operation is completed there is provided a shutter 13 hinged to the top plate of the shield as at 14 and adapted to be swung forwardly and upwardly when pushed with sufficient force by the sighting gunner.

Means for releasably holding the shutter in open or closed position comprise a latch plate 15 attached to the shutter and cooperating plunger 16 mounted in the shield. The latch plate 15 is an arcuate member having a circular inner face 17 terminating at its base in a conical slot 18 and its free end in a semi-conical slot 19, both slots being adapted to fit the plunger whereby the shutter is respectively held in the open and closed position.

The plunger 16 is formed with an enlarged head 20 having a conical face 21 and is adapted to be positioned and guided in reciprocation by the tubular extension 22 of a bracket 23. The shank of the plunger extends through an aperture in the shield and has secured thereto a handle 24 which serves by engaging the shield as a stop to limit forward movement of the plunger. Surrounding the shank of the plunger and disposed in the tubular extension 22 is a spring 25 confined between the head 20 of the plunger and the shield 11.

When the shutter is in the closed position, the conical face 21 of the plunger is held in the half-slot 19 through action of the spring 25 and firmly holds the shutter in place. When the shutter is swung open the latch 15 acts as a cam to retract the plunger until the shutter is completely raised when the plunger is free to engage in the full slot 18 to hold the shutter in the open position. Release of the shutter is accomplished by giving the handle a slight pull sufficient to disengage the plunger from the slot when the shutter by its own weight drops to the closed position whence the plunger springing into the slot 19 will hold the shutter in the lowered position. The shutter may be closed from a position in front of the shield by pressing down on it sufficiently to cam out the plunger.

While in the foregoing there has been illustrated and described such combination and arrangement of elements, as constitute the preferred embodiment of my invention, it is nevertheless desired to emphasize the fact that interpretation of the invention should only be conclusive when made in the light of the subjoined claims.

I claim:

1. In combination with a shield formed with a sighting aperture, a shutter hingedly carried by the shield for closing the aperture and adapted to be swung upwardly in opening, an arcuate latch plate secured to the shutter, said plate formed with slots on its inner face, a plunger extending through the shield and adapted to engage in the slots to releasably hold the shutter in either open or closed position, a tubular member secured to the shield for guiding and positioning the plunger, and a handle secured to the rear end of the plunger and adapted to engage the shield to limit forward movement of the plunger.

2. In combination with a shield formed with a sighting aperture, a shutter hingedly carried by the shield for closing the aperture and adapted to be swung upwardly in opening, an arcuate latch plate secured to the shutter, said plate formed with slots on its inner face, a plunger extending through the shield and adapted to engage in the slots to releasably hold the shutter in either open or closed position, and a handle secured to the rear end of the plunger and adapted to engage the shield to limit forward movement of the plunger.

3. In combination with a shield having a sighting aperture, a shutter hingedly carried by the shield for closing the aperture and adapted to be swung upwardly in opening, an arcuate latch plate secured to the shutter, said plate formed with slots on its inner face, a plunger extending through the shield and adapted to engage in the slots to releasably hold the shutter in open or closed position, and a handle on said plunger.

4. In combination with a shield formed with an aperture, a swinging shutter for said aperture, an arcuate latch plate secured to the shutter, a plunger carried by the shield and engaging the plate to releasably hold the shutter in open or closed position, said plunger adapted to be automatically disengaged from the plate in raising the shutter and a handle on the plunger for manually disengaging it in lowering the shutter.

5. In combination with a shield formed with an aperture, a swinging shutter for said aperture, means for holding the shutter in closed position, said means being adapted to be automatically released in opening the shutter.

6. In combination with a shield for guns, said shield formed with an aperture, a swinging shutter for said aperture, means for holding the shutter in open or closed position, said means automatically disengaged on movement of the shutter.

HARRY HOISINGTON.